United States Patent Office 3,050,412
Patented Aug. 21, 1962

1

3,050,412
DISPERSION COATINGS
Beresford Coe, Riverton, N.J., assignor to Rohm & Haas Company, Philadelphia, Pa., a corporation of Delaware
No Drawing. Filed May 14, 1959, Ser. No. 813,076
22 Claims. (Cl. 117—75)

This invention relates to novel resinous compositions valuable as coatings; to methods for using the compositions; and to coated articles of manufacture.

More specifically, the invention concerns a coating composition comprising an "acrylplastisol," i.e. a composition comprising an acrylate or methacrylate-modified plastisol. The acrylplastisol comprises a polyvinyl halide polymer, an acrylic polymer, an organic liquid compatible, non-volatile plasticizer and, preferably, a volatile organic liquid as fluidity promoter. The acrylplastisols of the invention may comprise optional adjuvants which are described hereinafter.

The compositions of this invention are ideally suited for coating of metal substrates by direct application to unprimed metal surfaces to give, upon heating, coatings which possess remarkable adherence to the metals. Moreover, the coatings provided by this invention are flexible, tough, and chemically inert, their hardness being tailored to suit the desired application.

The invention provides for a number of specially notable embodiments. One of such embodiments provides for an acrylplastisol in which there is incorporated an acidic ingredient. The compositions of this special embodiment possess even further remarkable and unexpected adhesion to smooth surfaces, such as on unprimed metals.

In yet another embodiment, the acrylic polymer component of the acrylplastisol is a copolymer of a specific 2-imidazolidinone, further defined below.

The invention also concerns methods for coating various substrates with the acrylplastisols of the invention by applying them on the substrate, and heating the applied material at elevated temperatures, whereby homogeneous gelling and fusion of the acrylplastisol results. The coating has outstanding tenacity to smooth surfaces, such as on metals.

In a valuable variant of the process for coating substrates, the invention provides a method for applying a solution of an acrylic polymer which is a copolymer of a specific 2-imidazolidinone, further defined below, as a primer for the substrate, heating the applied material at elevated temperatures, applying a plastisol and heating the applied material whereby fusion of the organic applied material results to give a strongly adhering coating. In this aspect, the acidic additive is preferably incorporated with the non-volatile phase. This variant of the method for coating substrates with the acrylplastisols of the invention has advantages further discussed below.

The invention provides a new article of manufacture having a coating which is adhering with remarkable tenacity to the unprimed surface of the coated article. A particular valuable aspect of the invention is a metal article of manufacture from which the coatings of this invention are not strippable with a knife.

2

A simplified flow diagram illustrating several embodiments of the invention is as follows:

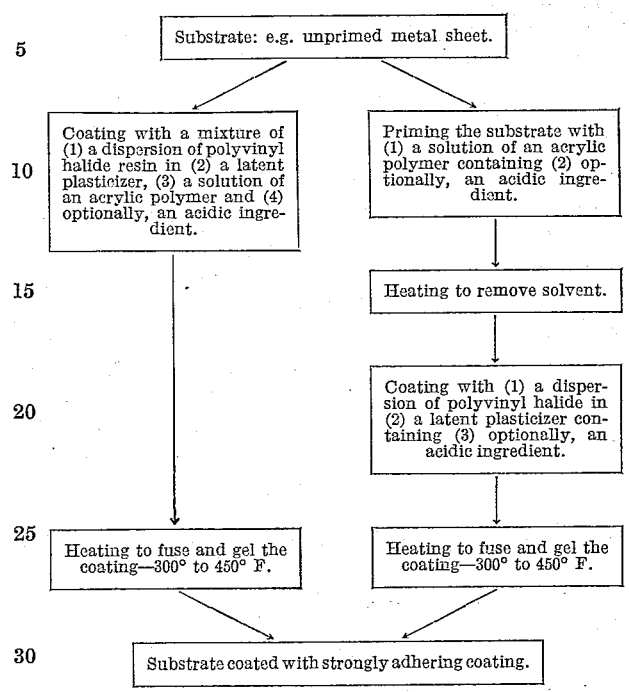

Polyvinyl halide resins have found extensive use in the lacquer and the coating fields because of their combination of desirable properties. Coatings and lacquers of polyvinyl halides exhibit resistance to atmospheric elements, to chemicals, water, and most solvents; they are free of odor, taste, and toxicity; they are strong, flexible, and tough; also, they possess high finish and durability.

The polyvinyl resins are applied as solution coatings to give lacquers or varnishes or, in a field of application quite distinct, as dispersions either as plastisols or organosols. Solution coatings are characterized by low molecular weight polyvinyl halide resins, generally not exceeding 10,000, or copolymers of vinyl halide resins with other vinyl monomers, dissolved in a volatile organic solvent to give a solution low in solid content. These solutions are applied to various surfaces and the solvent is evaporated by air-drying or by applying moderate temperatures. Solutions of polyvinyl resins have been used to coat various surfaces, such as wood, textiles, and paper with a thin lacquer or varnish type film. Yet, on application to smoother surfaces, such as on metals, and heating the coating at a moderate temperature, inadequate adhesion results. At higher temperatures, while somewhat better adherence results, numerous concomitant disadvantages follow, including a tendency of the resin to disintegrate. Generally, solution coatings display well-recognized deficiencies as film-forming materials because of their lack of toughness, durability, and tensile strength which characterize the high molecular weight resin obtained in the dispersion coating field.

In sharp contrast to the solution coatings, high molecular weight polyvinyl halide resins have been used as dispersions in liquid plasticizer which is non-volatile and which is a non-solvent for the high molecular weight polyvinyl halide resin at room temperature, while being a solvent for the resin at elevated temperatures. Such colloidal dispersions are termed "plastisols." When the plastisols contain a volatile organic liquid, which is a diluent, non-solvent for the polyvinyl halide resin, they are named "organosols." Both plastisols and organosols have been used in dispersion coatings to cover articles by application of the resin suspension to the surface followed by a heating at high temperatures whereby fusion occurs. However, quite unlike the thin lacquer or solution type, the coatings form dispersions totally lacking in adhesion to smooth surfaces, like metals, notwithstanding heating at elevated temperatures.

The lack of tenacity to the surface has posed a serious problem to the industry. Attempts have been made to circumvent it by priming the metal before application of the polyvinyl resins. The primer often is one or more resin which, though having improved adhesion onto the metal, is deficient with respect to other necessary properties for a coating; hence, a primer requires the application of a layer of polyvinyl halide over it. Recently, a method has been proposed whereby an etching treatment precedes the application of a thermoplastic adhesive film. It is evident that the use of primers or of adhesive layers for metal is expensive because of materials and labor. Accordingly, the coating industry has long been searching for a coating that would dispense with a primer and various attempts have been made to overcome the problem. It has been proposed to copolymerize $\alpha,\beta$-unsaturated carboxylic acids, such as maleic acid, with the vinyl halide. However, even these coatings leave much to be desired.

In accordance with the invention, there was discovered an acrylplastisol composition which gives a coating having remarkable adhesion upon applying the composition and heating the applied material on the substrate. The coatings of the invention are flexible and strong; their degree of hardness and flexibility may be modified as desired, to best suit the type of substrate and the ultimate application intended therefor.

Broadly, the invention provides what is named herein, an acrylplastisol, i.e. a fluid composition comprising a plastisol modified with an acrylic polymer.

The terms "plastisols" and "organosols," which are used in the description of the invention and in the claims, are exact terms which are well-known in the art.

Plastisols are compositions which are described at considerable length in "Modern Plastics," vol. 29, page 87 (1951). The term "plastisol" refers to a colloidal dispersion or suspension of a solid particulate polyvinyl halide resin in a non-volatile liquid plasticizer which is a poor solvent for the resin at ordinary temperatures as in the range of 25° to 60° C., but which dissolves the resin at elevated temperatures, as above 75° C., thereby forming a solid gel in which the resin and plasticizer remain completely compatible on cooling. When cold, the plastisols are pastes which are flowable and which can be molded, slushed, or spread on to any desired substrate. Plastisols which contain an additional liquid diluent, which is characterized by being compatible with the plasticizer and in which the polyvinyl resin is suspended, are known as organosols. The diluent is preferably volatile at curing temperature. Organosols utilizing suitable diluents, such as the hydrocarbons, have a high resin content and at the same time a workable fluidity.

In accordance with the invention, the thermoplastic vinyl halide polymers, which are an essential component of the compositions of this invention, refer to those polymers preferably containing a predominant quantity, i.e. at least 90% of the monomers units as vinyl halide units, more especially the vinyl halide units form 95%. The preferred group is a homopolymer of vinyl chloride. Other monomers that may be copolymerized in limited proportions with the vinyl halide include the vinyl type monomers such as, for example, vinylidene chloride, vinyl chloroacetate, chlorostyrene, chlorobutadienes, etc., and those copolymers of such vinylidene compounds and other unsaturated materials copolymerizable therewith, for example, copolymers of a vinylidene halide, such as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, ortho-chlorostyrene, parachlorostyrene, 2,5-dichlorostyrene, 2,4-dichlorostyrene, para-ethylstyrene, divinylbenzene, vinylnaphthalene, alpha-methylstyrene; dienes, such as butadiene, chlorobutadiene; unsaturated amides, such as acrylic acid amide, acrylic acid anilide; unsaturated nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids, and the like. Further useful copolymers are those obtained by copolymerization of vinyl chloride and an ester of an $\alpha,\beta$-unsaturated dicarboxylic acid such as diethyl maleate or other esters of maleic, fumaric, aconitic, itaconic acid, etc., in which 5 to 20 parts by weight of diethyl maleate or other analogous esters are used for every 95 to 80 parts by weight of vinyl chloride. Among the preferred esters of $\alpha,\beta$-unsaturated dicarboxylic acids are the alkyl esters in which the alkyl group contains 1 to 8 carbon atoms. By increasing the proportion of copolymerizable units other than vinyl halide units, a copolymer of increasing solubility in the viscosity reducing solvent is obtained, a fact which is to be avoided if the integrity of the valuable dispersion coating is to be preserved.

The vinyl halide polymers employed in the invention have a high molecular weight, as measured by the Standiger method, described in Ind. Eng. Chem., vol. 36, 1152 (1936), preferably at least 20,000, and more specifically above 50,000. Commercial grades of vinyl halide polymers having molecular weights between 100,000 and 200,000 are well-suited for use herein. Preferably, the polyvinyl halide polymers should be in a finely divided state of subdivision, generally they have a size of less than 5 microns, and, more especially, a size ranging between 0.1 and 1 micron. One skilled in the art will, of course, appreciate that the particle size of the polyvinyl halide affects the viscosity of the final acrylplastisol and that, accordingly, lower particle diameter favors higher viscosities and vice versa.

The vinyl halide polymers are, in accordance with the invention, employed as dispersed or suspended granules in a non-volatile organic liquid vehicle. This organic liquid vehicle is a liquid plasticizer which, at room temperature, does not solvate the polyvinyl halide resin, although it may somewhat swell it. At elevated temperatures, as above 300° F., it mutually solvates with the polyvinyl halide polymer to yield on cooling a homogeneous coating in conjunction with the polymeric acrylate and/or methacrylate.

The liquid organic non-volatile vehicle that is employed is any one, or a mixture of more than one, of any of the liquid plasticizers that are used in art for compounding plastisols and which are compatible with the acrylate and/or methacrylate polymer employed. The liquid plasticizer, as explained above, only solvates the polyvinyl halide at elevated temperatures; it is essentially non-volatile and it remains solvated in the polymeric system upon cooling. Especially when fluidity is to be promoted, the class of plasticizers that are employed in the plastisols for use in the invention are liquid plasticizers that have a boiling point above about 125° C., at 1 mm. pressure and a viscosity below 4000 poises at 25° to 30° C., especially a viscosity of not more than 50 poises, at 20° C.

By way of exemplification, suitable plasticizers for use in the plastisols that are employed in the invention are illustrated by the following:

(1) Liquid phthalates substituted with alkyl and/or alkoxyalkyl groups in which the alkyl groups contain a total of at least 8 carbon atoms, such as dibutyl phthalate, diamyl phthalate, dimethoxyethyl phthalate, dibutoxyethyl phthalate, dicyclohexyl phthalate, dihexyl phthalate, diheptyl phthalate, butyl octyl phthalate, the dioctyl phthalates such as di-(n-octyl) phthalates, di(2-ethylhexyl) phthalate, diisooctyl phthalates, didecyl phthalate, didodecyl phthalate, butylbenzyl phthalate, and mixtures of dialkyl phthalates which have an average of 8 carbon atoms in the alkyl groups such as exist in mixtures of diheptyl phthalate, dioctyl phthalate, and dinonyl phthalate; also, diphenyl phthalate, mixed ethoxyethyl phthalate, isooctyl isodecyl phthalate, and the like.

(2) Phosphonates and phosphates, such as those represented by the following formula:

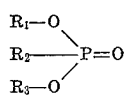

where $R_1$ may be phenyl, cresyl or xylyl, $R_2$ may be phenyl, cresyl or xylyl and $R_3$ a saturated alkyl group having from 1 to 10 carbon atoms, branched chain or isoalkyl. Typical are the alkyl diphenyl phosphates, the alkyl phenyl cresyl phosphates, the alkyl dicresyl phosphates, the alkyl phenyl xylyl phosphates, the alkyl dixylyl phosphates, the alkyl cresyl xylyl phosphates. Such phosphates include 2-ethylhexyl diphenyl phosphate, octyl diphenyl phosphate. Other suitable plasticizing phosphates include tricresyl phosphate, tritoyl phosphate, trioctyl phosphate, octyl cresyl phosphate, tributoxyethyl phosphate, and dicrescyl 2-ethylhexyl phosphate.

(3) Monomeric, acyclic, polybasic acid esters, such as those of dibasic acids having an alkylene chain in the acid residue of 4 to 8 carbon atoms, and alkyl, alkoxyalkyl, or aralkyl radicals in which the alkyl ranges from 2 to 12 carbon atoms or more. Typical are dibenzyl, dibutoxyethyl, tributoxyethyl phosphate, dicapryl, didecyl, di-2-ethylhexyl, diisooctyl-decyl, dinonyl, octyl decyl, esters of adipate, succinate, azelate, sebacate, subarate, and the like. Citrates and pimelitates may also be considered. Other plasticizing esters include:

(4) Monomeric acid esters as those of fatty acids of 4 to 18 carbon atoms as butyl oleate, butoxy ethyl oleate, polyethylene glycol di(2-ethylhexanoate), triethylene glycol caprylate, and the like.

(5) Polyalkalene glycol condensates where the alkalene group may be derived from adipates, azelates, and the like, and other suitable esters and polyethers.

(6) Hydrocarbons and halogenated hydrocarbons, such as aromatic petroleum oil and liquid chlorinated paraffin, and the like, and other esters as those of polyhydric alcohols like those of pentaerythritols. When it is desired to use epoxy type plasticizers, which may contain one or more epoxy groups, such as the epoxidized vegetable and animal oils as the tall oils, marine oils, safflower seed oils, linseed oils, soybean oil, or alkyl esters of epoxidized fatty acids of 12 to 24 carbon atoms of which the alkyl group may contain from 1 to 22 carbon atoms or other compatible epoxides, it is preferable to employ one or more other non-epoxy plasticizers, such as in an amount preferably in excess of 80%, and especially 90%, by weight of the total weight of plasticizer. Also, when the epoxy type plasticizers are used, it is advisable, as provided by the invention, to incorporate in the plastisol the specific acrylic copolymer and one or more of the acidic ingredients further discussed below. This combination provides for increased heat stability and resistance to migration with remarkable adhesion of the coating.

Generally, the monomeric plasticizers employed have a molecular weight in the range of about 190 to 900, more often in the range of 280 to 450, while the polymeric plasticizers, as the polyethers, polyesters, or polyglycols, range up to 8000 or more. Their viscosity is best measured in terms of centipoises, as measured on a Brookfield viscometer, and may range from 50 to 300,000, more especially from 2000 to 10,000 centipoises.

It is apparent from the above that many different plasticizers may be used in the manufacture of the coating compositions of the invention. New plasticizers are being offered, many of which will be found adaptable as components for the present compositions. One skilled in the art will appreciate that some of the plasticizers will lend themselves better for use as sole, or primary, plasticizers while others in more limited amounts may contribute properties desired for the particular application.

For judicious choice of the suitable plasticizers or mixtures thereof, one skilled in the art is guided by general considerations of compatibility of the plasticizers with the polymers, degree of plasticization desired, and the type of application intended for the coated substrate. The amount of plasticizer may vary over a wide range depending upon the type of product desired and the method employed for applying the acrylplastisols. By a judicious selection of the amounts and type of plasticizer, or mixtures thereof, there is obtained a coating having the desired degree of flexibility, hardness, and toughness. Generally, the ultimate test is that the acrylplastisol should be of a viscosity allowing for its application on the desired substrate. In terms of viscosity, this broadly is equivalent to a composition having a viscosity of about 1000 to 100,000 centipoises, at 20° C., preferably 1000 to 25,000, at 20° C. When the viscosity exceeds 100,000, the acrylplastisol is too viscous for general applications, while a viscosity below 1000 would lend itself only to specialized applications. Generally, optimum viscosity is reached when 20 to 120 parts, and more specially 40 to 80 parts, of liquid plasticizer are employed per 100 parts of polymeric vinyl halide.

In accordance with the invention, another essential component of the novel acrylplastisol compositions comprises an acrylic polymer which is derived from an acrylic ester to which the following formula may be given:

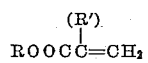

in which R' is a hydrogen atom or a methyl group, and R is preferably an alkyl group or an average of alkyl groups having 1 to 8 carbon atoms, and preferably 1 to 4 carbon atoms. The group R may also be cycloalkyl, alkoxyalkyl, aralkyl, terpenyl, bornyl, and isobornyl.

Typical acrylate and methacrylate esters include ethyl acrylate, propyl acrylate, isopropyl acrylate, butyl acrylate, ethyl methacrylate, propyl methacrylate, isopropyl methacrylate, butyl methacrylate, isobutyl acrylate, sec-butyl acrylate, amyl acrylate, isoamyl acrylate, isobutyl methacrylate, sec-butyl methacrylate, amyl methacrylate, hexyl acrylate, 2-ethylhexyl acrylate, octyl acrylate, and the like. When acrylate or methacrylate esters are used in which R exceeds 8 carbon atoms, as from 8 to 18 carbon atoms or higher, the coatings may not always have optimum physical characteristics.

Whenever reference is made to alkyl groups, the alkyl groups may be mixtures, such as those derived from mixtures of alcohols, such as mixtures of $C_4$ to $C_8$ alcohols resulting from the oxo process or mixtures of isomers from the same source. When the acrylates or methacrylates have alkyl groups of varying length, reference is made to "average alkyl group" which is calculated on the molar or group basis.

The selection of the particular mixture or individual acrylate or methacrylate is influenced by a number of factors, principally compatibility with the organic liquid vehicle, nature of the optional additives employed, the hardness of coating desired, and other similar considerations which one skilled in the art is familiar with. Generally, for instance, the smaller alkyl group favors compatibility with the more polar organic plasticizing vehicles and solvents, while alkyl methacrylates of alkyl groups, not exceeding 4 carbon atoms, cyclohexyl methacrylate and acrylate are amongst the monomers favoring harder coatings.

The acrylate and methacrylate polymers that are incorporated into the acrylplastisols of the invention have an average molecular weight that ranges from about 6000 to several million; generally it ranges from 8000 to about 20,000. For special situations, polymers having molecular weights outside of these ranges may be considered. One skilled in the art will appreciate that variations in the molecular weights of the acrylate and methacrylate polymer is one of the ways for conveniently adjusting the viscosity of the arcylplastisols to within an optimum range. Hence, by limiting the polymerization of the selected acrylate and methacrylate to the desired extent, by manners known in the art, polymers of lower viscosity are obtained. This may be favored when, for example, it is desired to spray the acrylplastisols of the invention on the selected substrate. Of course, the higher molecular weight acrylate polymers may conveniently be employed in the acrylplastisols by simply selecting a plasticizer of the more fluid type and/or by merely incorporating a greater amount of fluidity promoter in the acrylplastisol, as will be explained hereinafter.

In accordance with the invention, the acrylate and/or methacrylate polymer that is employed herein may be an acrylate or methacrylate copolymer with preferably not more than 45% by weight of another monovinylidene, $CH_2=C=$, type monomers such as acrylonitrile, methacrylonitrile, vinyl acetate, styrene, a $C_1$- to $C_4$-alkyl styrene, such as vinyl toluene (any of o-, m-, or p-methyl styrene or any mixture thereof). Also, the polymer may contain up to 10% by weight of a vinyl alkyl ether in which the alkyl group contains 1 to 8 carbon atoms. The polymer may contain up to 5% by weight of any other monoethylenically unsaturated copolymerizable monomer, including acids such as acrylic acid, methacrylic acid, itaconic acid, maleic acid, fumaric acid, the dimer of methacrylic acid, or the like.

Also the polymer may contain up to 10% of such monomers as contain functional groups (other than carboxyl) containing a reactive hydrogen atom as determined by the Zerewitinoff method (Ber. 40, 2023 (1907); 41, 2236 (1908); Kohler, J.A.C.S. 49, 3181 (1927)). Examples of such comonomers include hydroxyalkyl-($C_2$-$C_4$) acrylates and methacrylates, N-hydroxyalkyl ($C_1$-$C_4$)- and N,N-di-(hydroxyalkyl($C_1$-$C_4$))-acrylamides and -methacrylamides, acrylamide, methacrylamide, N-monoalkyl($C_1$-$C_4$)-acrylamides and -methacrylamides, aminoalkyl($C_2$-$C_4$) acrylates and methacrylates, N-aminoalkyl($C_2$-$C_4$)-acrylamides and -methacrylamides, N - monoalkyl($C_1$-$C_4$)aminoalkyl-($C_1$-$C_4$)-acrylamides and -methacrylamides.

In accordance with the invention, a further increase in the adherence of the coating to the metal is obtained when the acrylate polymer is a copolymer of the acrylate discussed above and one or more 2-imidazolidinones, or substituted tetrahydro-2-pyrimidinone monomers. These valuable comonomers may be represented by the formula:

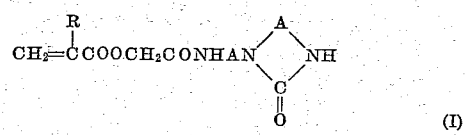

(I)

where R is selected from the group consisting of hydrogen and methyl, and A is an alkylene group having 2 to 3 carbon atoms.

The polymers of Formula I and their preparation are disclosed in United States application Serial No. 609,050, filed September 11, 1956, now Patent No. 2,881,155. Typical thereof are:

N-[β-(α-methacryloxyacetamido)ethyl]-N,N'-ethylene urea,
N-[β-(α-acryloxyacetamido)ethyl]-N,N'-ethyleneurea,
N-[β-(α-acryloxyacetamido)ethyl]-N,N'-trimethyleneurea, and
N-[β-(α-methacryloxyacetamido)ethyl]-N,N'-trimethyleneurea.

Generally, it is adequate to use 0.5 to 8 mole percent of the monomers of Formula I, greater proportions appear unnecessary. The comonomers are especially valuable when it is desired to apply the acrylic resin in solution as a primer, followed by the application of plastisol, with heating before and after application of the latter. Also, the comonomers, when employed in conjunction with the acidic ingredient, allow for use of greater proportions of epoxy plasticizers.

Another interesting class of minor comonomers that may be introduced into the acrylate and methacrylate copolymers are tert-aminoalkyl acrylate and methacrylates, in which the alkyl group contains from 1 to 4 carbon atoms or more, and preferably 1 to 2 carbon atoms.

Also, the polymers may further contain up to 10% of one or more comonomers selected from the group consisting of vinylpyridines, and N,N-dialkyl($C_1$-$C_4$)aminoalkyl-($C_2$-$C_4$) acrylates and methacrylates, which also generally serve to improve adhesion of the polymers to various substrates.

The arcylic polymers employed may be prepared by any suitable polymerization procedure known in the art. A convenient manner is by solution technique polymerization. If desired, the acrylic polymer may be polymerized to the desired degree by solution polymerization technique in situ in a suitable organic liquid plasticizer, or other suitable organic liquid diluent as toluene. The diluent may be removed, such as by stripping and substituted by the plasticizer if this one is not yet present. But often the organic diluent is allowed to remain in the acrylplastisol to provide optimum fluidity. Of course, polymerization may be effected in any other suitable way, such as by emulsion, suspension, or bulk techniques. When the polymer is prepared in any of the other ways just mentioned, it is merely necessary to dissolve the polymer that is obtained by the other techniques in a suitable solvent.

The proportions of acrylic resin to polyvinyl halide resin in the coating composition of this invention may range widely, such as from about 5 to 100 parts by weight of acrylic resin to 100 parts of polyvinyl halide resin; very satisfactory adhesion is obtained for most purposes in the range from 5 to 40 parts of acrylic resin for 100 parts by weight of polyvinyl halide resin. When less than 5 parts of acrylic resin is used, the benefits of increased tenacity to the metal substrate tend to be too limited for practical interest, whereas over 100 parts of acrylic resin per 100 parts of polyvinyl halide resin appear to be unnecessary. In compounding the acrylplastisols of the invention, the acrylic polymer and the polyvinyl polymers may be admixed to the liquid vehicle containing the sec organic plasticizer vehicle or either one of the polymers may be admixed to the liquid vehicle containting the second polymer. Other convenient procedures are apparent to one skilled in the art.

In addition to the components described above, it is preferable that the acrylplastisols of the invention comprise a volatile organic liquid to bring the fluidity of the composition within the optimum range. The volatile liquid is essentially a non-solvent for the polyvinyl halide resin, whereas it is a solvent for the acrylic and the methacrylic resin. Like the plasticizer the volatile organic liquid acts as a medium for suspending the polyvinyl halide resin. At elevated temperatures, as above 300° F., the organic liquid evaporates from the coating system. Incorporation of the volatile organic liquid may become also useful in promoting compatibility of the particular polyacrylate and polymethacrylate and with the particular liquid plasticizer selected in the cases where an increase in compatibility may be needed. Typical organic volatile liquids include the volatile liquid aromatic hydrocarbons having a boiling point within the range of about 35° to 250° C. Suitable hydrocarbons may be of the aromatic type, such as benzene, toluene, xylene, ethyl benzene, isopropyl benzene, their isomers and their homologs, or aliphatic and/or naphthenic hydrocarbons. The aromatic, aliphatic, and/or naphthenic hydrocarbons may be used singly or in suitable mixtures. Substantially pure aliphatic or naphthenic hydrocarbons, such as pentane, octane, nonane, decane, cyclopentane, methylcyclopentane, cyclohexane, etc. may be used, cheaper petroleum distillates are ordinarily utilized like petroleum naphthas boiling from about 100° C. to 150° C. and containing up to 20% aromatics, or petroleum fractions boiling from about 150° C. to 200° C. and containing about 1% to 5% aromatics. Aromatic petroleum distillate boiling from about 150° to 210° C. and containing about 55% to 65% aromatics is useful. Excellent results are obtained with use of about equal parts of xylene, and a petroleum distillate boiling from about 100° to 150° C. which contains about 15% aromatics.

Organic liquids which are well-suited for the purpose of this invention should preferably be relatively volatile in order to permit their removal from the coating during the heating step at which time the coating is fused on to the substrate. Accordingly, the organic liquids, which are employed in accordance with this invention, have a boiling point in the range of about 200° to 570° F., and preferably in the range of about 260° to 360° F., at atmospheric pressures. At least the organic liquids should be such that they may be removed from the resinous coating by heating to 360° F., or less, for 20 minutes.

The amount of volatile organic liquid which is used in the compositions of this invention is principally dictated by the fluidity desired in the ultimate composition, other considerations having been mentioned above. It will be appreciated that the fluidity of the composition may vary greatly depending on the type of application and method of application desired. Accordingly, it may be expressed by stating that the amount of volatile organic liquid is sufficient to give a fluid, though sometimes viscous, composition that is of suitable consistency for application to the substrate. It is evident that this will greatly vary according to the manner of application, for instance, whether it is desired to spray the composition on to the substrate, to dip the substrate into the composition, or to apply the composition on to the substrate by some kind of roller system, as well as on other factors, like the temperature, the type of plasticizer employed, and the like. Generally, about 50 to 300 parts by weight of volatile organic liquid per 100 parts of polymer are suitable; it is ordinarily preferred to have present about 100 to 150 parts and quite satisfactory results are obtained with about 60 parts by weight of volatile organic liquid and 40 parts by weight of polymer. Alternatively, a sufficient amount of volatile organic liquid may be added to bring the viscosity of the acrylplastisol within the optimum viscosity range discussed above.

In accordance with the invention, the compositions may contain, in addition to the polyvinyl halide, plasticizer vehicle acrylic resin, and volatile organic liquid, a number of other optional adjuvants. Such an optional adjuvant may be one or more volatile organic diluents which is a mutual non-solvent for both resins, that is, for the polyvinyl halide and also for the acrylic resins. Generally, it will not be necessary to employ these optional diluents to an extent of decreasing the solid contents to below 50%. Also, they will not be used to the extent of reducing the compatibility of the components of the compositions to the extent of causing flocculation of the acrylic resin and/or of disturbing the homogeneity of the dispersion to an undesired extent.

Typical of the volatile non-solvent diluents, there may be named alcohols, such as butanol, hexanol, isopropanol, butyl Carbitol, naphthenic hydrocarbons, hi-flash naphtha, mineral thinner, and the like; they may be employed singly or in suitable mixtures.

Further optional adjuvants that may be employed are various pigments, colors, fillers, and resin stabilizers. Base pigments as titanium dioxide, lead titanium, and basic lead carbonate are suitable. Various colors may be employed, if desired, such as any of the pigments.

In compounding the acrylplastisols of the invention, there are a number of convenient ways that may be followed. For instance, solid acrylate or methacrylate resin may be dissolved or suspended in polyvinyl halide suspensions in a plasticizer vehicle with or without other organic diluent; the methacrylate or acrylate polymer may be polymerized, as indicated above, in a suitable liquid plasticizer, or in an organic solvent which then, if desired, may be displaced by stripping by a suitable plasticizer; other permutations of convenient compounding procedure may be devised by one skilled in the art.

In accordance with the invention, there are a number of notable acrylplastisol compositions which possess even further adhesion on smooth surface, as on metals. One such composition is an acrylplastisol to which there is admixed one or more acidic additives. These additives specially promote strong adhesion in a faster time and/or at a lower temperature than is achieved without acidic additives. In accordance with the invention, the term "acidic additive" is meant to be construed in the broadest possible sense, since it has been found that a great variety of acidic material have this beneficial effect. Hence, the acidic additive may be defined by the Lewis definition of acids, as molecules or ions capable of coordinating with unshared electron pairs (for further details, see G. N. Lewis, Franklin Institute, 226, 293 (1938)); hence, including acids, as defined by Lowry-Bronsted, which are proton donors (T. M. Lowry—Chem. and Ind., 42, 43 (1923) and J. N. Bronsted, Rec. Trow. Chim. 42, 718 (1923)), and acids defined by the Archenius definition, as substances that ionize in aqueous solutions to produce hydrogen ions and which generally include the inorganic and organic acids and salts of these acids. One skilled in the art will readily appreciate that in view of the remarkable adhesion already obtained, in accordance with this invention, without acidic additive, and of the number of variable factors influencing adhesion, such as choice of monomers, the beneficial effect of the acidic additive may somewhat vary and even be somewhat overshadowed by other effects of greater magnitude. Generally, the beneficial effects of the acidic additive is most pronounced when the acrylic monomers are unmodified by other adhesion promoting monomers and/or when fluxing time is maintained at a minimum and in the lower temperature range. The acidic additives of Table A are illustrative of those that may be employed in the acrylplastisols of the invention.

TABLE A

Acidic Additives

| | |
|---|---|
| 1–5 Oxalic acid | 6–10 Adipic acid |
| Malonic acid | Phthalic acid |
| Malic acid | Benzoic acid |
| Succinic acid | Salicylic acid |
| Glutaric acid | Butyl benzoic acid |
| | |
| 11–15 Acetic acid | 16–20 Methacrylic acid |
| Dichloroacetic acid | Itaconic acid |
| Trichloroacetic acid | Levulinic acid |
| Chloroacetic acid | Ethyl hexoic acid |
| Acrylic acid | Sebacic acid |
| | |
| 21–25 Citric acid | 26–31 Stearic acid |
| Lactic acid | Benzoic acid |
| Maleic anhydride | Phthalic acid |
| Succinic anhydride | Valeric acid |
| Tetrachlorophthalic acid | Boron trifluoride |
| | Boron trifluoride complexes, the naphthenates and the like |
| | |
| 32–36 Sulfur trioxide | 37–41 Aluminum chloride |
| Stannus chloride | Toluene sulfonic acid |
| Sodium acetate | Pyromellitic acid |
| Ferric chloride | Butyl phosphoric acid |
| Zinc chloride | Trimesic acid |

42–49 Maleic acid
Tetrachlorophthalic acid
Hexachlorotetrahydrophthalic acid
Phosphoric acid
Sulfuric acid
Hydrochloric acid
Dimethyl ester of pyromellitic acid
Monobutyl ester of oxalic acid Polymeric acidic materials may also be employed with advantage. The acidic material may be incorporated into the compositions of this invention at any time prior to the application of the coating composition to the substrate. Conveniently, it is incorporated into the acrylic resin, and preferably it is dissolved therein. The amount of acidic material ranges from the smallest amount giving improved adhesion such as from 0.25% by weight on the combined weight of the polymers. Generally, the amount of acidic material ranges from about 0.5% to 3%, based on the combined weight of the acrylic polymers, 1% of acid giving coatings which are excellent since they are not even strippable with a knife. The use of amounts of acidic material in excess of 3% generally is not necessary.

The acrylplastisol composition of this invention is employed by applying it onto the surface of the substrates which are to be coated by any suitable procedure designed to give a coating of the thickness desired. The substrate may be coated by dipping it into the acrylplastisol, by spreading the acrylplastisol onto the surfaces, by spraying, by rolling, by percolating the composition over or through the substrate, and by equivalent procedures. Subsequently, the applied material is fused and gelled by heating it, whereby homogeneity of the polymers and of the plasticizer vehicle is achieved. For this purpose, the applied material is generally heated to a temperature of at least about 300° F. and sufficient to gel the applied coating, and not over 450° F. and insufficient to cause undesirable disintegration of the resin; for best results, heating is preferably carried out to at least 350° F. for a time sufficient to form and gel the acrylplastisol, such as for at least a few seconds to 40 minutes, or 365° F. for at least 20 minutes, with correspondingly shorter heating time for higher temperatures. When the acidic additives are employed, lower temperatures and/or shorter heating time are adequate. After heating, the coating is allowed to cool.

In a valuable variant of the process for coating substrates, the method comprises applying onto the surface to be coated a solution of acrylic resin copolymerized with the 2-imidazolidone specified above, heating the applied acrylic resin to a temperature at least sufficient to remove substantially all volatile organic liquid and at least at 300° F. to about 400° F., applying a polyvinyl halide resin suspension in plasticizer onto the acrylic coated substrate, and heating the applied material to a temperature of about 300° F. to about 400° F., preferably in the range of 325° to 375° F., and for a time sufficient to fuse the polyvinyl halide resin into the plasticizer and thereby give a homogeneous, though yet flexible, coating having remarkable adhesion onto the metal. In this aspect of the process, the acidic additive may be incorporated with the suspension or with the solution, or with both.

This aspect of the method for applying coating to substrates has the advantage in allowing greater flexibility in the selection of coating components. Accordingly, in this aspect of the method for coating, it is not necessary that the organic liquid which is the solvent for the acrylic resin be a non-solvent for the polyvinyl halide resin, as is specified in the coating organosols of this invention. Also, this aspect permits greater variety and amounts in the selection of other optional ingredients, and/or liquid vehicles.

A great variety of substrates may be coated in accordance with this invention. Illustrations are materials like leather, cloth, resin, wood, stone, concrete, and cement. The present coatings are of special interest for metals since the problem of adhesion on unprimed metals has been so acute until the present discovery. Any metal may be coated with the present compositions, including steel, aluminum, iron, tin, magnesium, nickel, and any alloy thereof, special benefits being obtained with ferrous metals.

The coatings of this invention combine the desirable properties for coatings with remarkable adhesion. The dry coatings generally have a thickness of 2 to 20 mils.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight. For testing the acrylplastisols, the following procedure is followed.

To a weighted quantity of plastisol, there is admixed a determined proportion of the acrylic solution. The viscosity is then adjusted to the desired extent by further addition of volatile organic liquid and, if desired, other diluents.

This composition is applied to the substrate, such as an unprimed bonderized steel panel, with an adjustable film caster to the desired thickness such as to a 10 mil opening wet film. The panel is placed in an oven maintained at 365° F. for 10 to 30 minutes.

Upon cooling, the adhesion of the coating is qualitatively determined by a penknife technique. By this technique, the coating is sliced or scraped from the steel panel. The ratings are as follows:

| Procedure | Adhesion |
|---|---|
| Coating not strippable | E—Excellent. |
| Coating difficult to strip with knife | G—Good. |
| Coating strippable with knife | F—Fair. |
| Coating easily strippable without knife | P—Poor. |

EXAMPLE 1

(a) A plasiticizer composition is prepared by combining 300 parts of finely divided polyvinyl chloride of a molecular weight of about 120,000 with 150 parts of di-2-ethylhexyl phthalate, 6 parts of a liquid Ba/Cd/Zn complex stabilizer, and mixing the ingredients together to form a fluid paste. One hundred parts of this plastisol are set aside for application to the sheet panels.

(b) To 100 parts of this plastisol, there are admixed 18 parts of a copolymer of 51% by weight of ethyl methacrylate and 49% by weight of methyl acrylate in 10 parts of xylene and 30 parts of toluene. The acryplastisol is a smooth fluid.

The compositions of (a) and (b) are applied to unprimed bonderized steel panels with a film caster. The panels are all placed in an oven maintained at 365° F. After 20 minutes, the panels are removed and allowed to cool at room temperature. The adhesion of the coating to the metal is tested by inserting a blade or cutting the coating and attempting to remove the coating whenever possible. The results are reported in Table I.

TABLE I
*Adhesion of Typical Coatings*

| Compositions | Adhesion |
| --- | --- |
| a | Poor—coating could be stripped by hand. |
| b | Excellent—coating could not be stripped. |

EXAMPLE 2

In Example 1(a), the plasticizer is substituted by the following:

(1) Dibutyl phthalate
(2) Butylbenzyl phthalate
(3) Didecyl phthalate
(4) (2) and (3) in a 50:50 ratio
(5) Tricresyl phosphate
(6) Octyl cresyl phosphate
(7) Dioctyl adipate
(8) Diisooctyl azeleate
(9) Dicapryl sebacate
(10) Acetyl tributyl citrate
(11) Pentaerythritol acid ester
(12) A polyethylene glycol adipate polyester The respective plastisols are admixed with 10 parts of acrylic polymer of composition 1(b). The fluid acrylplastisol is applied to metal panels. After heating at 365° F. for 20 minutes and cooling, there were obtained coatings that cannot be stripped by hand from the metal panels.

EXAMPLE 3

The following plastisols are blended together as in 1(a) from the following ingredients:

(a) 100 parts of a copolymer of 90 parts of polyvinyl chloride and 10 parts of polyvinyl acetate
40 parts dioctylsebacate
(b) 100 parts of a copolymer of 90 parts of polyvinyl chloride and 10 parts of polyvinylidene chloride
30 parts dioctyl adipate
(c) 100 parts of a copolymer of 91 parts of polyvinyl chloride, 6 parts of polyvinyl acetate, and 3 parts of polyvinyl alcohol
40 parts di-2-ethylhexyl phthalte
(d) 100 parts polyvinyl chloride
60 parts tricresyl phosphate Each one of these plastisols is blended with 28 parts of each one of the following acrylic polymers in 50 parts of the following organic liquid:

Mineral thinner _____ 10
Diisobutyl ketone _____ 10
Toluene _____ 30

(1) A copolymer of 60 parts of butyl methacrylate and 40 parts of methyl methacrylate.
(2) A copolymer of 25 parts of methyl methacrylate and 75 parts of ethyl methacrylate.
(3) A homopolymer of methyl acrylate.
(4) A homopolymer of butyl methacrylate.
(5) A copolymer of 50 parts of ethyl acrylate, 42 parts of styrene, and 8 parts of acrylic acid.
(6) A copolymer of 12 parts of ethyl acrylate, 80 parts of methyl methacrylate, and 8 parts of acrylamide.
(7) A copolymer of 30 parts of acrylonitrile, 30 parts of methyl methacrylate, 33 parts of ethyl acrylate, and 7 parts of dimethylaminoethyl methacrylate.
(8) A copolymer of 60 parts of methyl methacrylate, 30 parts of ethyl acrylate, and 10 parts of $\beta$-hydroxymethyl methacrylate.
(9) A copolymer of 68.5 parts of methyl methacrylate, 29 parts of ethyl acrylate, and 2.5 parts of N-[$\beta$-($\alpha$-methacryloxyacetamido)ethyl]-N,N'-ethyleneurea.
(10) A copolymer of 65 parts of methyl methacrylate, 30 parts of ethyl acrylate, 2 parts of methyl acrylate, and 3 parts of N-[$\beta$-($\alpha$-acryloxyacetamido)ethyl]-N,N'-trimethyleneurea.
(11) A copolymer of 60 parts of butyl methacrylate, 20 parts of hexyl methacrylate, and 20 parts of methyl methacrylate.
(12) A copolymer of 70 parts of methyl methacrylate, 27 parts of ethyl acrylate, and 3 parts of N-[$\beta$-($\alpha$-methacryloxyacetamido)ethyl]-N,N'-ethyleneurea.
(13) A copolymer of 70 parts of methyl acrylate, 10 parts of methyl methacrylate, 12 parts of hexyl methacrylate, and 8 parts of 2-ethylhexyl methacrylate.
(14) A copolymer of 90 parts of octyl methacrylate and 10 parts of butyl methacrylate.
(15) A copolymer of 10 parts of amyl acrylate, 10 parts of methacrylamide, 3 parts of 2-vinylpyridine, and 77 parts of methyl methacrylate.

The resulting acrylplastisols are fluids of variable viscosity depending on the particular plasticizer, acrylic ester and organic liquid employed.

The acrylplastisols described above are applied on unprimed bonderized steel plates using a Boston-Bradley adjustable film caster set at a 10 mil opening. The coated panels are heated at 365° F. for 20 minutes to flux the compositions. After cooling, the panels are removed from the oven and the coating is tested for adhesion by scraping the coating with a penknife.

The results show that in all cases very good adhesion was obtained.

EXAMPLE 4

The following acrylplastisol is compounded:

(a) 100 parts of a finely divided copolymer of polyvinyl chloride and vinyl acetate (96 to 4 parts, respectively),
40 parts of cresyl diphenyl phosphate,
10 parts of di(2-ethylhexyl)phthalate.
To 100 parts of this suspension there are added:
18 parts of an acrylic polymer of 55 parts of methyl acrylate and
45 parts of ethyl acrylate dissolved in 30 parts of a mixture of toluene and high boiling naphthas.
(b) To the acrylplastisol of (a) there is admixed 0.2 part of maleic acid.

Compositions (a) and (b) are spread on steel panels and treated for 20 minutes at 365° F. Table II reports the data.

TABLE II
*Effect of Acidic Additive*

| Composition: | Adhesion |
| --- | --- |
| (a) | Fair. |
| (b) | Excellent. |

EXAMPLE 5

In composition (*b*) of Example 4, maleic acid was substituted by the following acidic additives, the numeral reference referring to the numerals shown for the corresponding acidic additives on pages 26 and 27.

Acidic additives incorporated:

1 to 5, 6 to 10, 11 to 15, 16 to 20, 21 to 25, 26 to 31, 32 to 36, 38 to 41, and 42 to 49.

The coatings are applied as in Example 3. The coatings exhibited strong adhesion to the metal substrate.

It is apparent from the examples that many different polyvinyl halide resins, acrylic resins, plasticizer and organic liquid fluidity promoters may be utilized in the compounding of the compositions of the invention, and the respective proportions of the ingredients may also widely vary. Therefore, one skilled in the art will fully appreciate, without making the description and the examples a catalogue of useful components, that the invention lies in a composition in which essentially three components co-act in an unexpected manner to provide a valuable coating. Before heating, the composition is generally fluid and it comprises particles of solid materials, the polyvinyl halide resin, suspended undissolved in a liquid phase comprising an acrylic resin and a non-volatile organic liquid which is a potential plasticizer for the polyvinyl halide resin at elevated temperature, and preferably a fluidity promoter in an amount designed to maintain the highest possible solids content consistent with a workable fluidity. The solid particles are substantially compatible with the liquid phase to merge upon heating with the non-volatile components thereof and provide a homogeneous mass.

One skilled in the art will also appreciate that in some situations optimum compatibility of the various components of the coatings is not a requisite, but a preferred situation. Under some special circumstances, it may actually be desired to obtain some roughness and/or stickiness. Such a situation may be present when it may be desired to use the composition of the invention to bond together two or more metal sheets, or when the coating is not directly exposed to contact.

The degree of plasticization, the toughness, and other physical characteristics of the coating of this invention are modified by the selection of the suitable ingredients for the acrylplastisol composition. From his knowledge as a chemist, one skilled in the art will know or deduce with confidence their applicability to the purpose of the invention, as adapted to fit best the particular application he has in mind.

I claim:

1. A fluid composition comprising a mixture of
   (*a*) a particulate polymer of a vinyl halide having a molecular weight of at least 20,000, and
   (*b*) a liquid phase comprising
       (1) a non-volatile, organic, latent plasticizer which is a non-solvent for the polyvinyl halide polymer at ordinary temperature but which is a plasticizer for the polyvinyl halide at elevated temperature, and
       (2) a solution of a polymer of an acrylic monomer of the formula

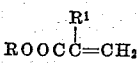

in which R is alkyl group containing 1 to 8 carbon atoms, and $R^1$ is selected from the group consisting of a hydrogen atom and a methyl group, said particulate vinyl halide polymer being suspended in the liquid phase, and the solids contents of said composition being at least 50 percent.

2. A fluid composition comprising
   (*a*) a particulate polymer of a vinyl halide having a molecular weight of at least 20,000, and
   (*b*) a liquid phase comprising
       (1) a non-volatile, organic, latent plasticizer which is a non-solvent for the polyvinyl halide polymer at ordinary temperature but which is a plasticizer for the polyvinyl halide at elevated temperature,
       (2) a solution of a polymer of an acrylic monomer of the formula

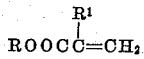

in which R is alkyl group containing 1 to 8 carbon atoms, and $R^1$ is selected from the group consisting of a hydrogen atom and a methyl group, and
       (3) an organic liquid which is a solvent for the acrylic polymer, a non-solvent for the vinyl halide polymer, and which is volatile at elevated temperature, said particulate vinyl halide polymer being suspended in the liquid phase, and the solids contents of said composition being at least 50 percent.

3. The composition of claim 2 in which the acrylic polymer has an alkyl group containing from 1 to 4 carbon atoms.

4. The composition of claim 3 in which at least one of the acrylic monomers is methyl methacrylate.

5. The composition of claim 2 in which the polymer comprises an acrylic monomer of the formula

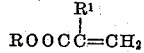

in which R is alkyl group containing 1 to 8 carbon atoms, and $R^1$ is selected from the group consisting of a hydrogen atom and a methyl group, copolymerized with not more than 45% by weight of a monovinylidene monomer.

6. The composition of claim 2 in which the polymer comprises an acrylic monomer of the formula

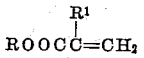

in which R is alkyl group containing 1 to 8 carbon atoms, and $R^1$ is selected from the group consisting of a hydrogen atom and a methyl group, copolymerized with not more than 5% by weight of an ethylenically unsaturated monomer.

7. A process of coating a substrate which comprises applying to a substrate the fluid composition defined in claim 2, heating the applied material to at least within the range of 300° to 350° F. whereby the applied material fuses and an adhering coating is formed.

8. A fluid composition comprising
   (*a*) a particulate polymer of a vinyl halide having a molecular weight of at least 20,000, and
   (*b*) a liquid phase comprising
       (1) a non-volatile, organic, latent plasticizer which is a non-solvent for the polyvinyl halide polymer at ordinary temperature but which is a plasticizer for the polyvinyl halide at elevated temperature,
       (2) a solution of a polymer of an acrylic monomer of the formula

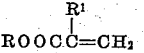

in which R is an alkyl group containing 1 to 8 carbon atoms, and $R^1$ is selected from the group consisting of a hydrogen atom and a methyl group, and
       (3) an organic liquid which is a solvent for the acrylic polymer, a non-solvent for the vinyl halide polymer, and which is volatile at elevated temperature, said particulate vinyl halide polymer being suspended in the liquid phase, said composition having incorporated therein at least a trace amount of an acidic ingredient, and the solids contents of said composition being at least 50 percent.

9. The composition of claim 8 in which the acidic ingredient is maleic acid.

10. A process of coating a substrate which comprises applying to a substrate the fluid composition defined in claim 8, heating the applied material to at least within the range of 300° to 350° F. whereby the applied material fuses and an adhering coating is formed.

11. The process of claim 10 in which the substrate is metallic.

12. A fluid composition comprising
(a) a particulate polymer of a vinyl halide having a molecular weight of at least 20,000, and
(b) a liquid phase comprising
(1) a non-volatile, organic, latent plasticizer which is a non-solvent for the polyvinyl halide polymer at ordinary temperature but which is a plasticizer for the polyvinyl halide at elevated temperature,
(2) a solution of a copolymer of an acrylic monomer of the formula

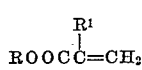

in which R is an alkyl group containing 1 to 8 carbon atoms, and R¹ is selected from the group consisting of a hydrogen atom and a methyl group, and a maximum of about 10% of a 2-imidazolidinone of the formula

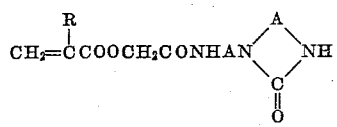

in which R is selected from the group consisting of a hydrogen atom and a methyl radical and A is an alkylene chain containing from 2 to 3 carbon atoms, and
(3) an organic liquid which is a solvent for the acrylic polymer, a non-solvent for the vinyl halide polymer, and which is volatile at elevated temperature, said particulate vinyl halide polymer being suspended in the liquid phase, and the solids contents of said composition being at least 50 percent.

13. The composition of claim 12 in which the 2-imidazolidinone is N-[β-(α-methacryloxyacetamido)-ethyl]-N,N'-ethyleneurea.

14. The fluid composition of claim 12 in which the acrylic polymer is a copolymer of methyl methacrylate and ethyl acrylate.

15. The composition of claim 12 in which there is incorporated an acidic ingredient.

16. A coated substrate having an adhering coating of a fused composition comprising
(1) a polymer of vinyl halide having a molecular weight of at least 20,000, and
(2) a polymer of an acrylic monomer of the formula

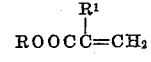

in which R is an alkyl group containing 1 to 8 carbon atoms, and R¹ is selected from the group consisting of a hydrogen atom and a methyl group, said vinyl halide polymer being fused into a non-volatile, organic plasticizer thereby forming a homogeneous coating.

17. The coated substrate in claim 16 in which the substrate is a metal.

18. A metal substrate having an adhering coating of a fused composition comprising a polymer of vinyl halide having a molecular weight of at least 20,000, and a polymer of an acrylic monomer of the formula

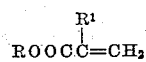

in which R is an alkyl group containing 1 to 8 carbon atoms, and R¹ is selected from the group consisting of a hydrogen atom and a methyl group, and an acidic ingredient, said vinyl halide polymer being fused into a non-volatile organic plasticizer thereby forming a homogeneous adhering coating.

19. A coated metal substrate having an adhering coating of a fused composition comprising a polymer of a vinyl halide having a molecular weight of at least 20,000, a polymer of an acrylic monomer of the formula

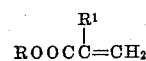

in which R is an alkyl group containing 1 to 8 carbon atoms, and R¹ is selected from the group consisting of a hydrogen atom and a methyl group, and a maximum of about 10% of 2-imidazolidinone of the formula

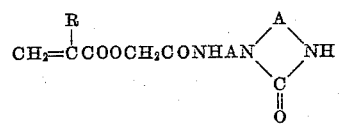

in which R is selected from the group consisting of a hydrogen atom and a methyl radical and A is an alkylene chain containing from 2 to 3 carbon atoms, said vinyl halide polymer being fused into a non-volatile, organic plasticizer thereby forming a homogeneous and adhering coating.

20. A process of coating a substrate which comprises applying to the substrate a composition comprising
(1) a primer solution and (2) a fluid dispersion, the primer comprising a solution in a volatile organic liquid of a polymer of an acrylic monomer of the formula

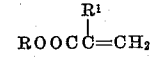

in which R is an alkyl group containing 1 to 8 carbon atoms, and R¹ is selected from the group consisting of a hydrogen atom and a methyl group, and a maximum of about 10% of a monomer of the formula

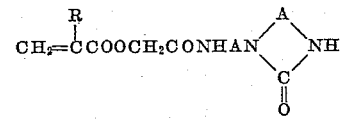

in which R is selected from the group consisting of a hydrogen atom and a methyl radical, and A is an alkylene chain containing from 2 to 3 carbon atoms, and said primer solution being free of the dispersion coating,
applying the primer onto the substrate,
heating the applied primer to at least a temperature of 300° to 400° F. and sufficient to remove substantially all volatile, organic liquid,
applying over the primed substrate a fluid dispersion of vinyl halide having a molecular weight of at least 20,000 dispersed in a liquid, non-volatile, latent, organic plasticizer which is a non-solvent for the polyvinyl polymer at ordinary temperature but which is a plasticizer for the polyvinyl halide at elevated temperature, and
heating the applied material to at least a minimum temperature of about 300° to 400° F., whereby the substrate is coated with a homogeneous adhering coating.

21. The process of claim 20 in which an acidic ingredient is present in admixture with the primary solution.

22. The process of claim 20 in which the acidic ingredient is present in admixture with the fluid dispersion.

References Cited in the file of this patent

UNITED STATES PATENTS

| | | |
|---|---|---|
| 2,385,920 | Jenkins | Oct. 2, 1945 |
| 2,427,513 | Spessard | Sept. 16, 1947 |
| 2,431,078 | Powell et al. | Nov. 18, 1947 |
| 2,491,102 | Frowde | Dec. 13, 1949 |
| 2,703,765 | Osdal | Mar. 8, 1955 |
| 2,709,664 | Evans | May 31, 1955 |
| 2,881,155 | Hankins | Apr. 7, 1959 |